C. A. HIRTH.
GAGE.
APPLICATION FILED DEC. 27, 1910.

1,048,073.

Patented Dec. 24, 1912.

Witnesses:
C. S. Brown
M. O. Bender

Inventor:
Carl A. Hirth
by Foster Freeman Watson Coit
Attys.

UNITED STATES PATENT OFFICE.

CARL ALBERT HIRTH, OF STUTTGART, GERMANY, ASSIGNOR TO FORTUNA-WERKE ALBERT HIRTH, OF CANNSTATT, GERMANY, A FIRM.

GAGE.

1,048,073. Specification of Letters Patent. Patented Dec. 24, 1912.

Application filed December 27, 1910. Serial No. 599,298.

*To all whom it may concern:*

Be it known that I, CARL ALBERT HIRTH, a subject of the German Emperor, residing at Stuttgart, Germany, have invented a new and useful Improvement in Gages, of which the following is a specification.

The present invention relates to measuring apparatus or gages, and in particular to apparatus for taking internal measurements and has for its object to enable great delicacy and accuracy of measurement to be attained and to enable bores of widely varying depth to be measured.

For this purpose the apparatus consists essentially of a bell crank or like two-armed lever of which one arm is actuated by a slidable member operated by the object that is to be measured, while the other arm controls an indicating device through the intermediary of a suitable connecting device.

Figure 1:
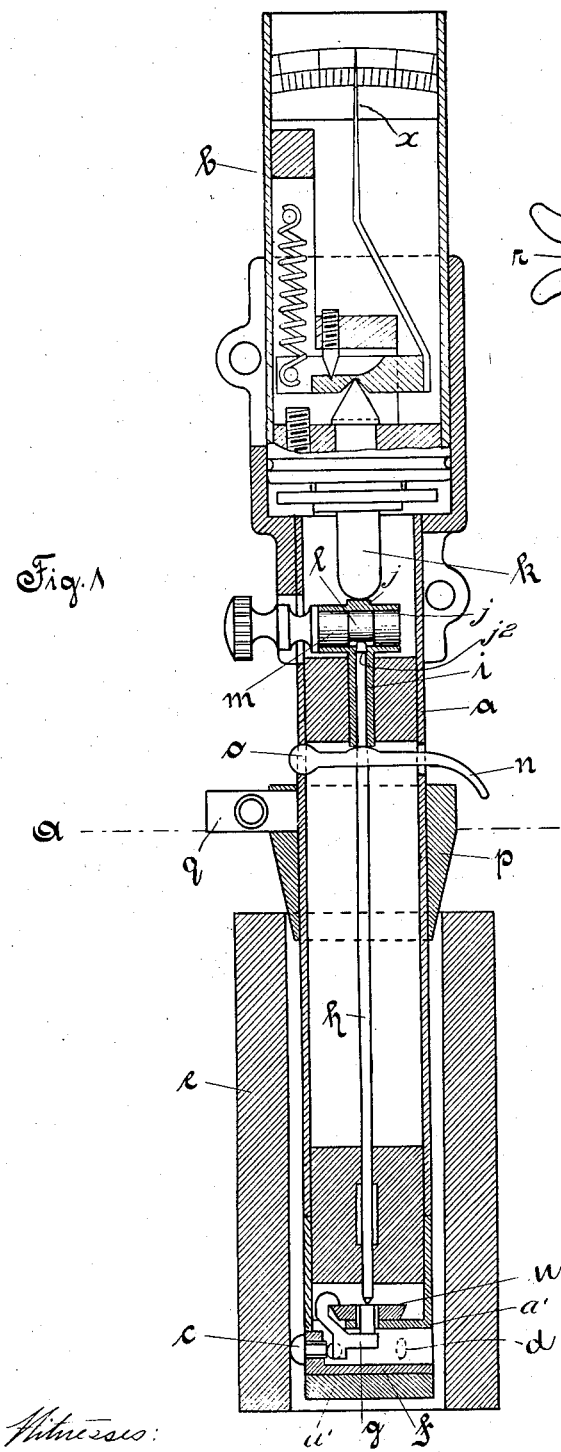
Figure 2:
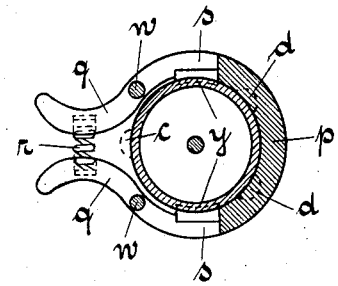
Figure 3:
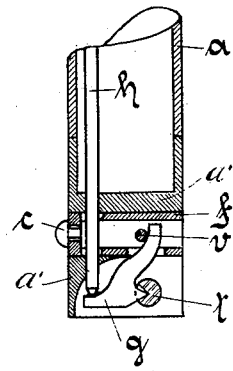

In the accompanying drawing Figure 1 shows in vertical longitudinal section an example of internal measuring apparatus embodying the invention; Fig. 2 is a section on the line A—A of Fig. 1; and Fig. 3 shows in vertical longitudinal section the measuring head of a somewhat modified form of apparatus.

The parts of the measuring apparatus are housed in a tubular holder $a$, in the one end of which is inserted an indicating device $b$. On the other or lower end $a'$ of the tubular holder $a$ is the movable gaging contact stud $c$ which, in conjunction with two fixed gaging contacts $d$, enables the sleeve or the like $e$ to be measured when slipped over the said contacts. The movable gaging contact $c$ is arranged on a slide $f$, which is guided in a straight line and acts on the horizontal arm of a bell crank lever $g$. The vertical arm of this lever acts on a rod $h$ which extends longitudinally of the holder $a$ and carries at its outer or upper end a plunger $i$ which actuates a spring-loaded stud $k$ projecting from the indicating device $b$. A transverse pin or spindle $m$ fitted within a non-rotary sleeve or casing $j$ and having an eccentric surface or cam $l$ serves for the fine adjustment of the pointer $x$ of the indicating device after a standard gage has been pushed on to the gaging end of the holder $a$, said sleeve or casing $j$ having on its top side a hump $j'$, on which the stud $k$ rests and in its bottom side, immediately below the hump $j'$, an opening $j^2$ through which the upper end of the rod $h$ projects into contact with the eccentric waist portion $l$ of the pin $m$. This adjustment is made by turning the pin or spindle $m$, whereby the cam or eccentric surface $l$ which abuts against the end of the rod $h$, effects a lengthening or shortening—according to the direction of rotation—of the transmitting rod between the gaging contact $c$ and the pressure stud $k$.

A finger lever $n$, which is supported by its rounded end $o$ in the wall of the holder $a$, and is provided with a central passage for the rod $h$, enables the pressure stud $k$ and the plunger $i$ to be moved inward so as to release the gaging contact $c$ while the measuring apparatus is being inserted into the article to be measured, thereby obviating unnecessary wear of the gaging contact by friction.

On the insertion of the measuring apparatus, the sliding piece $p$ mounted on the holder $a$ rests with its conical outer surface against the mouth of the bore that is to be measured, thus centering the measuring apparatus with relation to the bore. A pair of tongs $q$, adapted to pivot on pins $w$ in the sliding piece $p$, engage the wall of the holder $a$ by means of their ends $s$, which are controlled by a spiral spring $r$ and are preferably lined with fiber, thus holding the sliding piece in any position. In order, however, to insure that this retention is not effected solely by frictional contact, it is advisable to provide the ends $s$ of the tongs with small teeth $y$ (Fig. 2), which extend in a direction transverse to the axis of the holder $a$ and engage in a corresponding slight serration on the holder $a$, whereby the sliding piece $p$ can be adjusted at convenience.

In the form shown in Fig. 1 $g$ is the bell crank lever, which is mounted in the edge of and overlaps a plate $u$. In this form the apparatus is specially suitable for measuring bores that are closed at one end, since the gaging contact $c$ is placed close to the end of the holder $a$. This advantage is foregone in the form shown in Fig. 3, since in that case the bell crank lever $g$ is mounted in a bearing $t$, near the end of the holder, the slide $f$ then acting on the horizontal end of the lever $g$ through a transversely inserted stud $v$. The rod $h$ is located away from the axis of the holder $a$ so as to leave room for having the arms of the bell crank lever *g* as large as possible with relation to the diameter of the holder. In this modification the apparatus can consequently be conveniently constructed for gaging small bores.

What I claim as my invention and desire to secure by Letters Patent is:—

1. In a gage a portable support or carrier, a fixed outwardly protruding lateral stop or rest thereon, a laterally yieldable member carried thereby and protruding laterally therefrom, indicating means, and means for connecting said member with the indicating means so as to transmit motion from the one to the other longitudinally of the gage.

2. In a gage the combination of a carrier, a fixed laterally protruding lateral rest or stop thereon, a laterally projecting and laterally movable slide carried by said carrier, a lever adapted to be actuated by a lateral movement of said slide when the latter is moved from without, an index, and means for transmitting motion longitudinally from said lever to said index.

3. In a gage the combination of a carrier of a laterally projecting and laterally movable member, an index, connecting means between said member and said index adapted to transmit motion from the one to the other, and means for initially adjusting the effective length of said connecting means.

4. In a gage the combination of a carrier, a laterally projecting and laterally movable member carried thereby, an indicating device, means including a two-armed lever adapted to transmit motion from said member to said indicating device for transmitting motion from the one to the other, and a rotatable pin or spindle interposed transversely between the aforesaid two-armed lever and the indicating device and having an eccentric surface or cam through which said pin or spindle can cause motion to be transmitted to the indicating device.

5. In a gage the combination of a carrier, a laterally projecting and laterally movable member carried thereby, an indicating device, means interposed between said member and said indicating device for communicating motion to the latter, such means including a lever adapted to be actuated by said member, a connecting rod, a pin or spindle arranged transversely of said connecting rod and having an eccentric surface or cam located between said rod and the indicating device, and a sleeve or casing surrounding said pin or spindle.

6. In a gage the combination of a carrier, a laterally projecting and laterally movable member carried thereby, an indicating device means interposed between said member and said indicating device for communicating motion to the latter, such means including a lever adapted to be actuated by said member, a connecting rod, a pin or spindle arranged transversely of said connecting rod, and having an eccentric surface or cam located between said rod and the indicating device, and a finger lever adapted to force back the aforesaid sleeve together with the pressure stud of the indicating device, and a sleeve or casing surrounding said pin or spindle.

7. In a gage the combination of a tubular holder, a measurement indicating device, means for determining a measurement, means adapted to be actuated by said determining means for actuating said indicating device, and an adjustable collar on said tubular holder unconnected with the measurement indicating means and having a conical surface adapted to enter the bore that is to be measured and to center the holder therein.

8. In a gage the combination of a tubular holder, a measurement indicating device, means for determining a measurement, means adapted to be actuated by said determining means for actuating said indicating device, an adjustable collar on said tubular holder, unconnected with the measurement indicating means and having a conical surface, said sleeve or collar being slidable on the tubular holder, and jaws adapted to lock said collar against sliding movement.

9. In a gage the combination of a tubular holder, a measurement indicating device, means for determining a measurement, means adapted to be actuated by said determining means for actuating said indicating device, an external sleeve or collar embracing said tubular holder and having a conical surface, said sleeve or collar being slidable on the tubular holder, and means for locking said sleeve or collar against sliding movement, such locking means comprising a pair of tongs rotatably mounted in said sleeve or collar and capable of engaging with the wall of the holder or casing and of being released by manual pressure.

10. In a gage the combination of a tubular holder, a measurement indicating device, means for determining a measurement, means adapted to be actuated by said determining means for actuating said indicating device, an adjustable collar embracing said tubular holder and having a conical surface, said sleeve or collar being unconnected with the measurement indicating means or with the means for supporting the gage and being slidable on the tubular holder, and jaws for engaging said holder and locking said collar against sliding movement, said holder having a roughened or serrated surface at the part where the jaws engage it.

11. In a gage the combination of a carrier; a plurality of contact parts or members protruding laterally therefrom at least one of which is fixed on the side of the carrier and forms a lateral rest or stop therefor, another of said contact parts or members being laterally yieldable relatively to the carrier and adapted to serve as a feeler; an index; connecting means between said feeler member and said index adapted to transmit motion from the one to the other; and means for initially adjusting the effective length of said connecting means.

12. In a gage the combination of a carrier; a plurality of contact parts or members protruding laterally therefrom at least one of which is fixed on the side of the carrier and forms a lateral rest or stop therefor, another of said contact parts or members being laterally yieldable relatively to the carrier and adapted to serve as a feeler; an indicating device; means including a two-armed lever adapted to transmit motion from said feeler member to said indicating device for transmitting motion from the one to the other; and a rotatable pin or spindle interposed transversely between the aforesaid two-armed lever and the indicating device and having an eccentric surface or cam through which said pin or spindle can cause or permit motion to be transmitted to the indicating device.

13. In a gage the combination of a carrier; a plurality of contact parts or members protruding laterally therefrom at least one of which is fixed on the side of the carrier and forms a lateral rest or stop therefor, another of said contact parts or members being laterally yieldable relatively to the carrier and adapted to serve as a feeler; an indicating device; means interposed between said feeler member and said indicating device for communicating motion to the latter, such means including a lever adapted to be actuated by said feeler member; a connecting rod; a pin or spindle arranged transversely of said connecting rod and having an eccentric surface or cam located between said rod and the indicating device; and a sleeve or casing surrounding said pin or spindle.

14. In a gage the combination of a carrier; a plurality of contact parts or members protruding laterally therefrom at least one of which is fixed on the side of the carrier and forms a lateral rest or stop therefor, another of said contact parts or members being laterally yieldable relatively to the carrier and adapted to serve as a feeler; an indicating device; means interposed between said feeler member and said indicating device for communicating motion to the latter, such means including a lever adapted to be actuated by said feeler member; a connecting rod; a pin or spindle arranged transversely of said connecting rod, and having an eccentric surface or cam located between said rod and the indicating device; a finger lever adapted to force back the aforesaid sleeve together with the pressure stud of the indicating device; and a sleeve or casing surrounding said pin or spindle.

15. In a gage the combination of a tubular carrier; a measurement indicating device; means for determining a measurement, such means including a plurality of contact parts or members protruding laterally from the carrier at least one of which is fixed on the side of the carrier and forms a lateral rest or stop therefor, another of said contact parts or members being laterally yieldable relatively to the carrier and adapted to serve as a feeler; means adapted to be actuated by said determining means for actuating said feeler member; and an adjustable collar on said tubular holder unconnected with the measurement indicating means and having a conical surface adapted to enter the bore that is to be measured and to center the holder therein.

In witness whereof I have hereunto set my hand in the presence of two subscribing witnesses.

CARL ALBERT HIRTH.

Witnesses:
ERNEST ENTENMANN,
FRIDA KLAIBER.